June 26, 1951 V. STANZEL 2,558,109
SINGLE LINE CONTROL FOR MINIATURE AIRCRAFT
Filed March 9, 1945 3 Sheets-Sheet 1
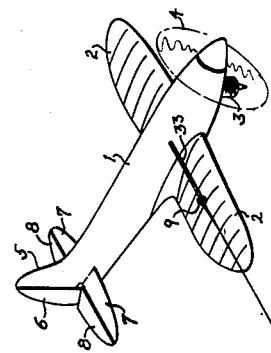
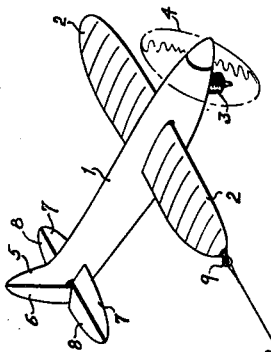
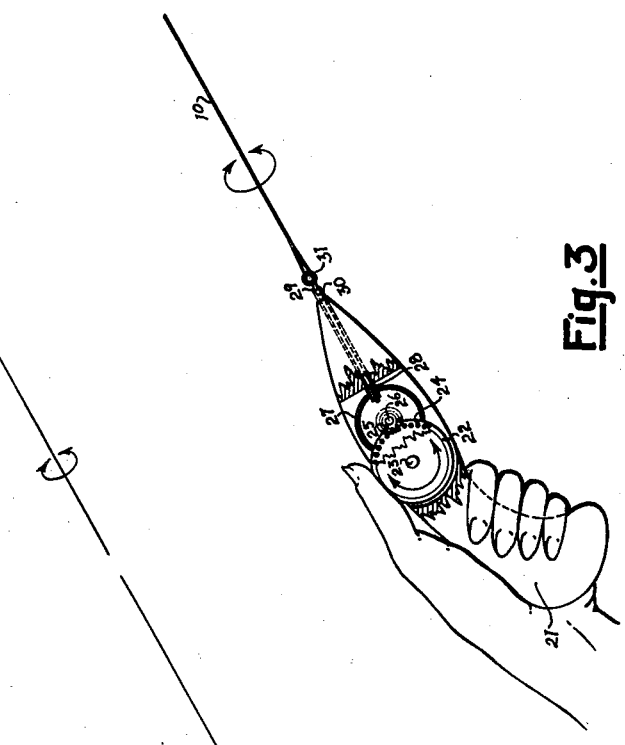
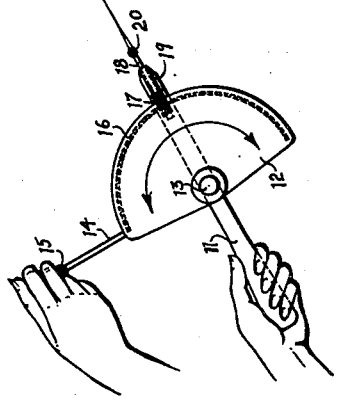
Inventor
Victor Stanzel
By E. V. Hardway
Attorney June 26, 1951 V. STANZEL 2,558,109
SINGLE LINE CONTROL FOR MINIATURE AIRCRAFT
Filed March 9, 1945 3 Sheets-Sheet 2
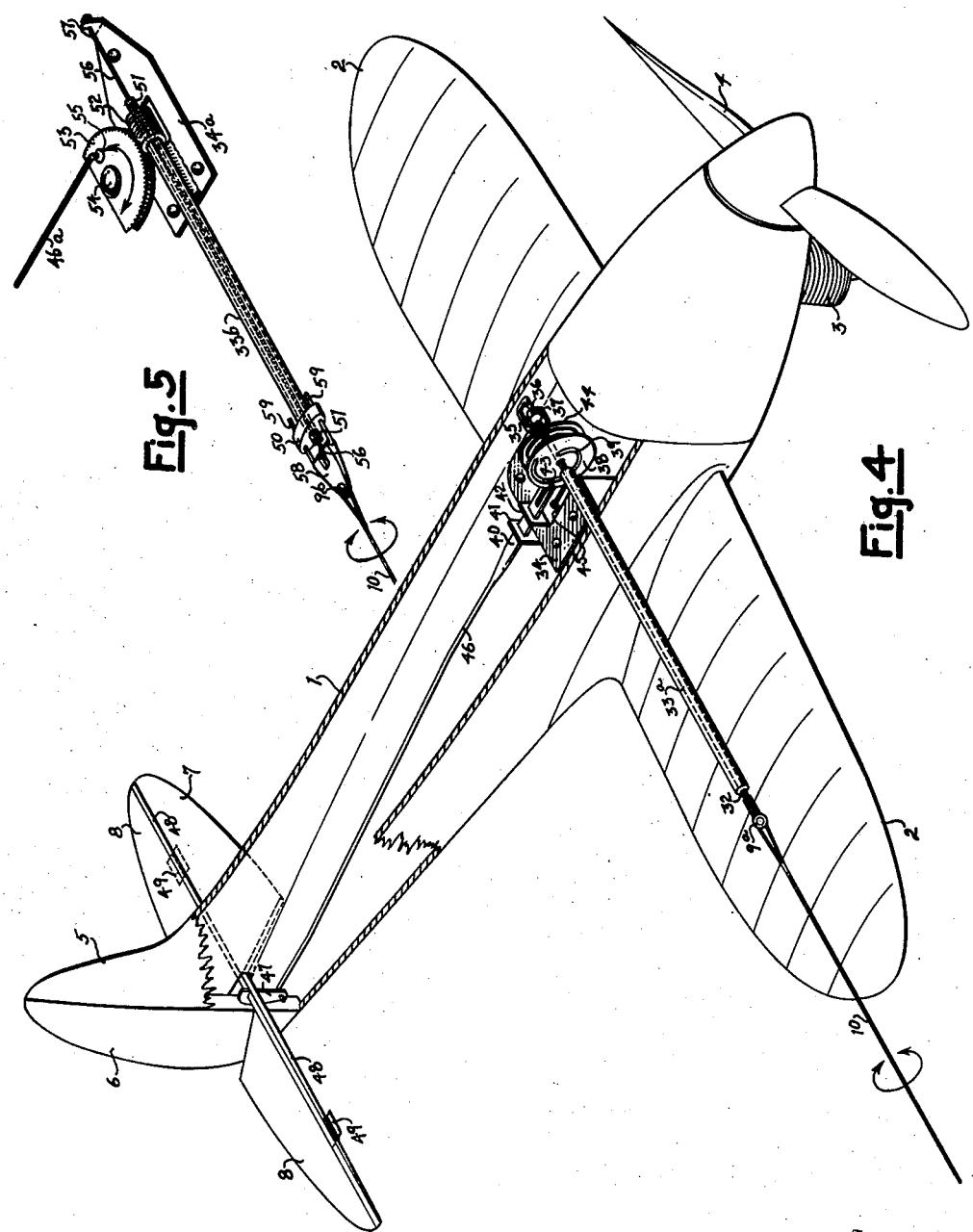
Inventor
Victor Stanzel
By
E. V. Hardway,
Attorney June 26, 1951  V. STANZEL  2,558,109
SINGLE LINE CONTROL FOR MINIATURE AIRCRAFT
Filed March 9, 1945  3 Sheets-Sheet 3

Inventor
Victor Stanzel
E. V. Hardway.
Attorney

Patented June 26, 1951

2,558,109

UNITED STATES PATENT OFFICE 2,558,109

SINGLE-LINE CONTROL FOR MINIATURE AIRCRAFT

Victor Stanzel, Schulenburg, Tex.

Application March 9, 1945, Serial No. 581,840

22 Claims. (Cl. 46—77)

This invention relates to controlling means for miniature aircraft.

An object of the invention is to provide a single line control for controlling a miniature aircraft, either of the glider or self-propelled type, about its lateral axis by means of torsional force applied to the end of the control line opposite the aircraft and which is effective in varying the static balance of the aircraft about its lateral axis.

Another object of the invention is to provide a single line elevator control for controlling a miniature aircraft, either of the glider or self-propelled type, about its lateral axis by means of an elevator actuating device in the aircraft operatively connected to the control line, said device being actuated by torsional force applied to the end of the line opposite the aircraft.

A further object of the invention is to provide, in a miniature aircraft controlled about its lateral axis by means of a control line transmitting torsional force, lateral stability for the aircraft by attaching the control line to the structure of the aircraft or to the elevator actuating device at a point laterally of the longitudinal axis of the aircraft.

A still further object of the invention is to provide, in a miniature aircraft controlled about its lateral axis by means of a control line transmitting torsional force, a simple manually operated device for applying torsional force to the operating end of the control line for the purpose of controlling the aircraft.

Other objects and novel features of the invention will be disclosed by the detailed description thereof and the accompanying drawings, wherein:

Figure 1 shows a perspective view of a miniature aircraft in flight, and controlled about its lateral axis by a torsional control line operatively attached thereto, said control line being actuated by a manually operated control handle, shown in a side elevation.

Figure 2 shows a perspective view of a miniature aircraft in flight, having the rotative control line connected directly to the wing structure thereof.

Figure 3 shows a side view, partly broken away, of another embodiment of the manually operated control handle for actuating a torsional control line, said handle being adapted to be operated by a single hand.

Figure 4 shows a perspective view of a miniature aircraft, partly broken away to show the embodiment of an elevator control device adapted to be actuated by a torsional control line, said elevator control device embodying a cam and cam follower for the transformation of torsional force on the control line to push and pull action on the elevator push-pull rod.

Figure 6:
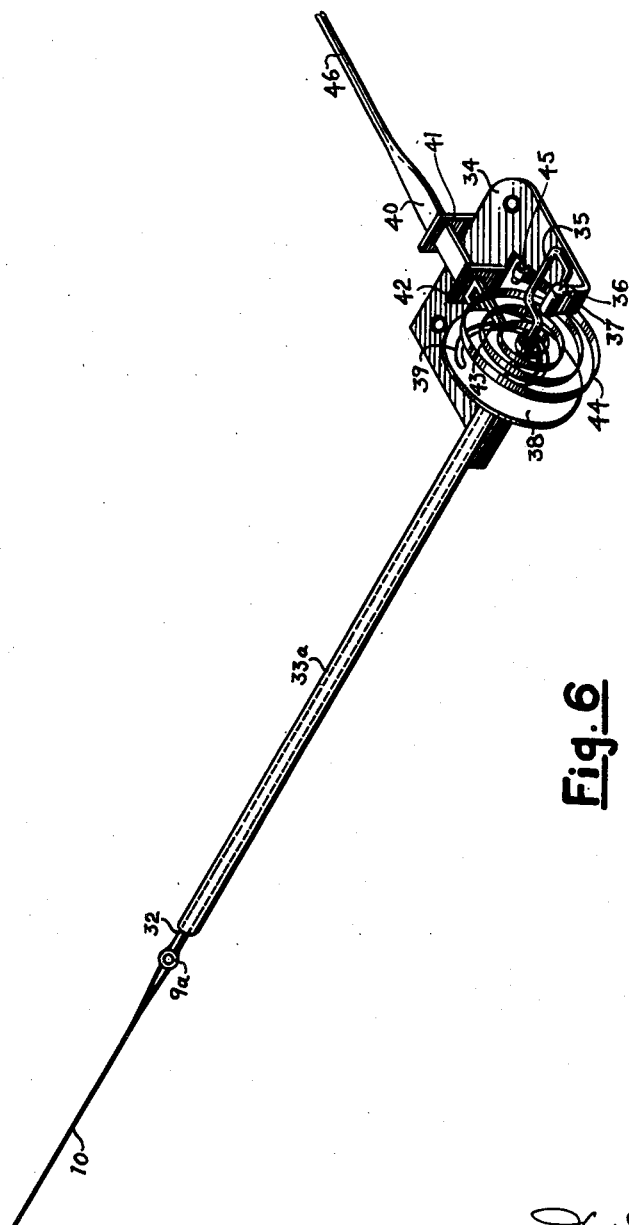

Figure 5 shows a perspective view of an elevator control device for a miniature aircraft, embodying a worm and worm gear for the transformation of rotative force, transmitted by a torsional control line, to push and pull action on the elevator push-pull rod, and also embodying a flexible tension member which, together with other mechanical means, relieves the worm assembly of end thrust friction by by-passing the line tension caused by centrifugal force and other factors and Figure 6 is an enlarged, perspective view of the elevator control device.

Referring now more particularly to the drawings wherein like numerals of reference designate the same parts in each of the figures, the numeral 1 designates the fuselage of the aircraft which has lateral wings 2, 2 fastened thereto and which may be equipped with a suitable motor 3, preferably of the internal combustion type and fastened to the shaft of which there is a conventional propeller 4.

The numeral 5 designates the vertical fin and the numeral 6 designates the rudder. The aircraft is also equipped with stabilizers 7, 7 and elevators 8, 8. These parts are conventional.

Located laterally of the longitudinal axis of the aircraft, there is a fixed anchor point 9, to which the torsional control line 10 is operatively attached. This point of attachment may be fixed directly to the wing structure of the aircraft, as shown in Figure 2, or to a rigid arm 33, extending laterally from the fuselage, as illustrated in Figure 1. It is necessary that this point 9 be fixed with respect to the longitudinal axis of the aircraft in order to impart lateral stability to the aircraft.

The numeral 11 designates a handle adapted to be held in one of the operator's hands and rotatively attached to the handle 11, on the pivot 13, is a semi-circular plate 12. Fixed on one side of the plate 12 is an arcuate gear rack 16 which is in mesh with a small pinion gear 17 rigidly fastened to the shaft 18. The shaft 18 is rotatably mounted in a bearing fitting 19 fastened to the forward end of the handle 11. Rigidly fixed to the plate 12 is a handle 14 fitted with a knob 15 adapted to be grasped by the operator's other hand, for operation of the device.

When the operator pushes the handle 14 back and forth, thus rotating the plate 12 as indicated by the double arrow in Figure 1, the shaft 18 is revolved back and forth, respectively, by virtue of its geared connection to the plate 12.

The end of the control line 10, opposite the aircraft, is operatively connected to the shaft 18 by means of a suitable fitting 20. When the handle 14 is pushed forward, the handle end of the control line is rotated in a clockwise direction, facing the aircraft. This stores up a torsional force in the control line 10, tending to force the nose of the aircraft downwardly, into a diving attitude. Pulling back the handle 14, reverses the process and the nose of the aircraft is forced upwardly into a climbing attitude.

The effectiveness of the torsional force of the control line 10, in moving the flying aircraft about its lateral axis, depends upon the size, length and physical properties of the control line, which is made up, preferably, of spring steel or music wire. The magnitude of the torsional force acting on the aircraft is also directly proportional to the number of revolutions given the control line 10 by the action of the control handle.

The body of the control handle shown in Figure 3 is designated by the numeral 21. Rotatably mounted on a pivot 23, within a recess in the body 21, is a pin gear wheel 22 whose outer margin extends beyond the upper surface of the body 21 and is adapted to be rotated by the thumb of the operator's hand grasping the handle. A second gear wheel 27, having its teeth extending parallel to its axis, is rotatably mounted on the pivot 26 within the recess of the body 21. A pinion gear 25, coaxially attached to the gear wheel 27 is in mesh with the pin cogs 24 of the gear wheel 22. A small pinion gear 28, in mesh with the gear wheel 27, is fixed to the inner end of the shaft 29, rotatably mounted in the bearing sleeve 30 set in the forward end of the body 21. A suitable fitting 31 is fixed to the outer end of the shaft 29 for operatively connecting the control line 10 thereto.

When the thumb of the hand, gripping the handle 21, is moved back and forth, rotating the gear wheel 22, as indicated by the double arrow, the shaft 29 is revolved back and forth, thus transmitting torsional force to the control line 10.

In Figure 4, the numeral 32 designates a metal shaft rotatably mounted in a housing 33a extending laterally from the fuselage 1 of the aircraft. The housing 33a is securely fixed to a metal plate 34 mounted inside the fuselage. A fitting 9a attached to the outer end of the shaft 32, serves as means for operatively connecting the torsional control line 10 to said shaft. The other end of the shaft 32 is formed with a C bend 35 having a bearing point 36 positioned coaxially with the housing 33a. A thrust bearing plate 37 is securely fixed to the mounting plate 34 and the point 36 bears against the same to take up the line thrust, caused by centrifugal force and other factors, with the least possible friction.

A cam plate 38 having a spiral slot 39, is coaxially fixed on the shaft 32, near the inner end thereof.

The inner end of a spiral spring 44 is fixed to the shaft 32, near the cam plate 38 and the outer end of the spring 44 is attached to a prong 45 fixed to the mounting plate 34.

A slider 40, movable longitudinally in bearing lugs 41 and 42, has a cam follower 43 mounted at its forward end to ride in the spiral slot 39 of the cam plate 38.

An elevator push-pull rod 46, suitably connected to the rear end of the slider 40, is operatively connected to the elevator control horn 47 depending from and attached to the elevator spar 48, 48 to which the elevators 8, 8 are securely fixed. The elevators 8, 8 are hinged to the stabilizers 7, 7 by means of the hinges 49, 49.

With the control line 10 in neutral position, that is free from torsional force, the spiral spring 44 holds the cam plate 38 in a position approximately midway of its range of travel. The range of travel of the cam plate 38 is approximately ⅞ of a full revolution, being limited by the C bend 35 which is stopped by the support of the bearing plate 37.

With the cam plate 38 in the halfway position, the elevators 8, 8 are held in a neutral position.

When the control line 10 is loaded with torsional force by use of a manually operated control handle, such as shown in Figure 1 or in Figure 3, the cam plate 38 is moved by the equalization of the torsional force stored in the torsional control line 10 and the resisting torsional force of the spiral spring 44.

This movement of the cam 38 correspondingly moves the slider 40, thus moving the elevators 8, 8. The extent of movement of the cam plate 38 depends upon the number of revolutions given the end of the control line 10 by the control handle, which governs the amount of torsional force exerted on the spiral spring 44 by the torsional control line 10.

Rotating the control line 10 in a clockwise direction, facing the aircraft, will cause the elevators 8, 8 to be moved downwardly, thus causing the aircraft to assume a diving attitude. Reversely, when the control line 10 is rotated in a counter-clockwise direction, the elevators 8, 8 are moved upwardly, causing the aircraft to climb. The return of the control line 10 to its neutral or unloaded position will cause the cam plate 38, as well as the elevators 8, 8 to automatically return to the neutral position due to the torsional tension of the spiral spring 44.

In Figure 5, the numeral 33b designates a tubular housing securely attached to a mounting plate 34a. The mounting plate 34a is adapted to be mounted in the fuselage of a miniature aircraft, such as illustarted in Figure 4, with the tubular housing 33b extending laterally therefrom.

Mounted to rotate freely in the housing 33b is a tubular shaft 51, having a worm 52 coaxially attached thereto at its inner end. Coaxially attached to the outer end of the tubular shaft 51, is a clutch block 50 having holes therethrough to receive the slidable clutch prongs 59, 59 of the clutch fitting 58.

Securely attached to a prong 57 on the mounting plate 34a and passing through the tubular shaft 51 is a flexible tension member 56, preferably a silk or linen line. The outer end of the tension member 56, is securely attached to the clutch fitting 58. A suitable fitting 9b provides means for operatively connecting the control line 10 to the clutch fitting 58.

Mounted to rotate on the pivot 54 there is a worm gear 53 which is in mesh with the worm 52. An elevator push-pull rod 46a is pivotally and eccentrically connected to the worm gear 53 by means of the bearing 55.

In use, the tension on the control line 10, caused by centrifugal force and other factors, is transmitted directly to the lug 57 by virtue of the linkage of the control line 10 to the clutch fitting 58 and through the flexible tension member 56.

Rotative force transmitted by the control line 10 revolves the clutch fitting 58 and twists the flexible tension member 56. The rotative action of the clutch fitting 58 is transmitted to the clutch block 50 by means of the slidable clutch prongs 59, 59 thus revolving the tubular shaft 51, as well as the worm 52.

By virtue of the slidable clutch prongs 59, 59 the clutch fitting 58 is free to move back and forth, longitudinally, to compensate for the shortening and lengthening of the flexible tension member 56 due to its twisting action. The clutch block 50 and the worm 52 are thereby relieved of all end thrust friction and can be revolved freely regardless of line tension.

Back and forth rotation of the worm 52 will cause a corresponding back and forth rotation of the worm gear 53, as indicated by the double arrow in the illustration. This action causes a back and forth movement of the elevator push-pull rod 46a and consequent up and down movement of the elevators to control the miniature aircraft about it lateral axis.

In practice, it has also been found practical to operatively connect the torsional control line 10 directly to the fuselage 1 of the aircraft, or to an elevator control device, such as illustrated in Figure 4 or Figure 5, within the fuselage 1. In this case the tubular housing 33a or 33b is shortened and does not extend outside the fuselage 1.

In this event, for the purpose of lateral stability for the aircraft, the torsional control line 10 is attached to the structure of the aircraft at a point laterally of its operative connection by means of a guide ring, fixed to the aircraft structure at this lateral point and through which the control line 10 is threaded.

In using the torsional control arrangement, as detailed in Figure 1, the elevators of the miniature aircraft are adjusted and set in a fixed position before the take-off, to cause the aircraft to fly in approximately level flight. Flight control of the miniature aircraft about its lateral axis is then maintained by pushing and pulling the control handle 14 back and forth, or rotating the gear wheel 22 back and forth, which is effective in raising and depressing the nose of the aircraft to climbing and diving attitudes, respectively.

In the use of the torsional elevator control type of miniature aircraft, as detailed in Figure 4, the elevators are actuated in flight, by the operation of the control handle 14, or gear wheel 22, to control the aircraft about its lateral axis.

The drawings and description are illustrative merely while the broad principle of the invention will be defined by the appended claims.

What I claim is:

1. In a self-supporting miniature aircraft having a fuselage and lateral wings; a control line capable of transmitting torsional force and operatively attached, at one end, to the structure of the aircraft at a point laterally of the longitudinal axis of the aircraft to control the craft about its lateral axis by torsional force transmitted through the said control line and to stabilize the aircraft about its longitudinal axis, and means for subjecting the control line to torsion.

2. In a self-supporting miniature aircraft having a fuselage and lateral wings; a control line capable of transmitting torque and operatively connected to the structure of the aircraft to control the aircraft about its lateral axis by means of torque transmitted through said control line one end of, said control line being attached to the structure of the aircraft at a point laterally of the longitudinal axis, and means for manually rotating the other end of the control line to control the torque transmitted through said control line.

3. In a self-supporting miniature aircraft having a fuselage and lateral wings; a control line attached, at one end, to the structure of the aircraft through which torsional force is transmitted to the aircraft to control the craft, a handle at the other end of the line having a rotatable member thereon and means connecting said rotatable member with said other end of the line whereby said other end of the control line may be rotated about its longitudinal axis, upon rotation of said member.

4. In a device for controlling a self-supporting miniature aircraft, a control line for transmitting torsional force and connected, at one end, to the aircraft, a handle, a manually rotatable element mounted on the handle, a torque transmitting shaft operatively connected with said element and with the other end of the control line whereby the control line is subjected to torque upon rotation of said element.

5. In a miniature aircraft having a fuselage, lateral wings and an elevator; means for actuating the elevator, a torsional control line operatively connected to said means and effective to operate the means by torque transmitted through said control line and means for relieving said actuating means of control line tension.

6. In a miniature aircraft having a fuselage, lateral wings and an elevator; means on the aircraft for actuating the elevator, a control line operatively connected to said means to operate said means by torsional force transmitted through said control line, means for relieving said actuating means of friction due to control line tension and means for rotating the control line.

7. In a miniature aircraft having a fuselage, lateral wings and an elevator; means on the aircraft for actuating the elevator, a control line operatively connected to said actuating means to operate the means by torque transmitted through said control line, means for relieving said actuating means of friction due to control line tension, one end of said control line being operatively connected to said actuating means at a point laterally of the longitudinal axis of the aircraft to stabilize the aircraft about its longitudinal axis and means at the other end of the control line for rotating the control line about its longitudinal axis.

8. In a miniature aircraft having a fuselage, lateral wings and an elevator; means on the aircraft for actuating the elevator, a torsional control line operatively connected to said means to operate the means by torque transmitted through said control line, means for relieving said actuating means of control line tension, said control line being attached to the structure of the aircraft at a point laterally of the longitudinal axis to stabilize the aircraft about its longitudinal axis and means under the control of an operator for rotating the control line about its longitudinal axis.

9. In a miniature aircraft having a fuselage, lateral wings and an elevator; means on the aircraft for actuating the elevator, a control line capable of transmitting torsional force and operatively connected to said means to operate said means by torque in the control line and means for relieving said actuating means of control line tension.

10. In a miniature aircraft having a fuselage, lateral wings and an elevator; a rotary member mounted on the aircraft, a torsional tension member operatively connected to said rotary member, a control rod connected to the elevator and also connected to the rotary member and arranged to be moved thereby, upon rotation of said rotary member, to control the elevator, and a torsional control line connected to the rotary member and effective, upon rotation of the control line, about its longitudinal axis, to rotate said rotary member.

11. In a miniature aircraft having a fuselage, lateral wings and an elevator; a rotary member mounted on the aircraft, a torsional tension member operatively connected to said rotary member, a control rod connected with the elevator and also having an eccentric connection with the rotary member and a flexible control line capable of transmitting torque and operatively connected with the rotary member to rotate said rotary member by torsion in the control line.

12. In a miniature aircraft, an elevator control device comprising a rotary member mounted on the craft, a connecting member connected to the elevator and also having an operative connection with the rotary member whereby, upon rotation of the latter, the connecting member will be moved to control the elevator, a shaft, a gear thereon geared to the rotary member to rotate the latter, a flexible control line capable of transmitting torque, and having a slip-joint connection with the shaft whereby torsion of the line will rotate the shaft, and a flexible anchor line through which the control line is connected to the craft to relieve said shaft and gear of control line tension.

13. In a miniature aircraft, an elevator control device comprising, a rotary member mounted on the craft, a connecting member connected to the elevator and also having an operative connection with the rotary member whereby, upon rotation of the latter, the connecting member will be moved to control the elevator, a tubular shaft, a gear thereon geared to the rotary member to rotate the latter, a flexible control line capable of transmitting torque, a sliding clutch connecting the control line with the shaft whereby torsion of the line will rotate the shaft, a flexible anchor line through the shaft one end of which is anchored to the craft and the other end of which is connected to the adjacent end of the control line to relieve the tubular shaft of control line tension.

14. Elevator actuating means for a miniature aircraft comprising, a shaft adapted to be operatively connected to a control line capable of transmitting rotative force to rotate the shaft, supporting means for rotatively mounting said shaft on the aircraft, means for relieving said shaft of control line tension, a rotary member mounted to be rotated by said shaft, means for operatively connecting said rotary member to the elevator to actuate the elevator.

15. Elevator actuating means for a miniature aircraft comprising, a shaft adapted to be operatively connected to a control line capable of transmitting torsional force to rotate the shaft, supporting means for rotatively mounting said shaft on the aircraft, means for relieving friction due to control line tension on said shaft, a rotary member mounted on said shaft, an elevator connecting member having an operative connection with the rotary member whereby, upon rotation of the rotary member, the connecting member will be moved to actuate the elevator.

16. Elevator actuating means for a miniature aircraft comprising, a rotary member, means for operatively connecting said rotary member to a control line capable of transmitting torsional force to rotate the rotary member by torque, supporting means for rotatively mounting said rotary member on the aircraft, a yieldable torsional tension member operatively connected to said rotary member, an elevator connecting member having an operative connection with the rotary member whereby, upon rotation of the rotary member the connecting member will be moved to actuate the elevator.

17. Elevator actuating means for a miniature aircraft comprising, rotary members operatively connected together, means for rotatably mounting said rotary members on the aircraft, means including a shaft operatively connecting one of said rotary members to a torsional control line capable of transmitting rotative force to rotate said rotary members, a yieldable torsional tension member operatively connected to said rotary members, means for operatively connecting one of said rotary members to the elevator to actuate the elevator.

18. Elevator actuating means for a miniature aircraft comprising, a shaft adapted to be operatively connected to a control line capable of transmitting torsional force to rotate the shaft, supporting means for rotatively mounting said shaft on the aircraft, a rotary member mounted on said shaft, a torsional tension member operatively connected to the rotary member to retain the rotary member in one position, said torsional tension member being yieldable to allow the rotary member to be rotated, a connecting member adapted to be operatively connected to the elevator and also having an operative connection to the rotary member whereby, upon rotation of the rotary member, the connecting member will be moved to actuate the elevator.

19. Elevator actuating means for a miniature aircraft comprising, a shaft, means for rotatably mounting said shaft on the aircraft, means for operatively connecting to said shaft a control line capable of transmitting torsional force to rotate said shaft, means for relieving said shaft of friction due to control line tension, rotary members operatively connected to said shaft to be rotated thereby, a connecting member adapted to be operatively connected to the elevator and also having an operative connection with one of said rotary members whereby, upon rotation of said rotary members, the connecting member will be moved to actuate the elevator.

20. Elevator actuating means for a miniature aircraft comprising, a tubular shaft, means for rotatively mounting said shaft on the aircraft, a fitting for operatively connecting to said shaft a control line capable of transmitting torsional force to rotate said shaft, a flexible tension member through said shaft, one end of said tension member being connected to said fitting and the other end of which is anchored to said mounting means, rotary members operatively connected to each other, one of said rotary members being mounted on said shaft to rotate with the latter, a connecting member adapted to be operatively connected to the elevator and also having an operative connection with one of said rotary members whereby, upon rotation of said rotary member, the connecting member will be moved to actuate the elevator.

21. Elevator actuating means for a miniature aircraft comprising, a shaft adapted to be operatively connected to a control line capable of transmitting rotative force to rotate the shaft, supporting means for rotatively mounting said shaft on the aircraft, means for relieving said shaft of control line tension, a rotary member mounted to be rotated by said shaft, means associated with said rotary member for an operative connection with the elevator to actuate the elevator.

22. In a miniature aircraft, an elevator control device comprising, a gear mounted on the aircraft, a connecting member for an operative connection with the elevator and also having an operative connection with the gear whereby, upon rotation of the latter, the connecting member will be moved to control the elevator, a tubular shaft, a rotary member thereon operatively engaged with the gear to rotate the latter, means including a slip-joint for an operative connection with a flexible control line capable of transmitting torque whereby torque of the line will rotate the shaft and a flexible anchor line one end of which is anchored to the aircraft and the other end of which is operatively connected with the control line.

VICTOR STANZEL.

REFERENCES CITED

The following references are of record in the file of this patent:

UNITED STATES PATENTS

| Number | Name | Date |
|---|---|---|
| 2,061,953 | Sampson | Nov. 24, 1936 |
| 2,292,416 | Walker | Aug. 11, 1942 |